United States Patent
Wright et al.

(10) Patent No.: US 6,183,408 B1
(45) Date of Patent: Feb. 6, 2001

(54) ROTOR SHAFT ASSEMBLY HAVING NON-LINEAR STIFFNESS

(75) Inventors: Herschel E. Wright, Gilroy; Derek G. Petch, Los Gatos; Charles N. Godin, Palo Alto, all of CA (US)

(73) Assignee: Beckman Coulter, Inc., Fullerton, CA (US)

(*) Notice: Under 35 U.S.C. 154(b), the term of this patent shall be extended for 0 days.

(21) Appl. No.: 09/304,466

(22) Filed: May 3, 1999

(51) Int. Cl.[7] ........................................ B04B 9/14
(52) U.S. Cl. ........................... 494/82; 494/83; 494/84; 464/180
(58) Field of Search .................. 494/16, 20, 46, 494/82, 83, 84; 74/572, 574; 464/179, 180

(56) References Cited

U.S. PATENT DOCUMENTS

| | | |
|---|---|---|
| 2,346,432 * | 4/1944 | Heintz . |
| 2,827,229 * | 3/1958 | Blum . |
| 3,233,825 * | 2/1966 | Lomb . |
| 3,604,617 * | 9/1971 | Patterson . |
| 3,676,723 * | 7/1972 | Drucker . |
| 3,770,191 * | 11/1973 | Blum . |
| 3,779,451 * | 12/1973 | Lehman . |
| 3,902,659 * | 9/1975 | Brinkmann et al. . |
| 3,938,354 * | 2/1976 | Lehman . |
| 4,201,066 * | 5/1980 | Nolan, Jr. . |
| 4,205,779 * | 6/1980 | Jacobson . |
| 4,214,179 * | 7/1980 | Jacobson et al. . |
| 4,226,359 * | 10/1980 | Jacobson . |
| 4,236,426 * | 12/1980 | Meinke et al. ......................... 74/574 |
| 4,322,030 * | 3/1982 | Jacobson et al. . |
| 4,324,440 | 4/1982 | Steigenberger et al. . |
| 4,334,718 * | 6/1982 | Hirt et al. ............................ 464/180 |
| 4,511,350 * | 4/1985 | Romanauskas ........................ 494/84 |
| 4,513,566 * | 4/1985 | Rajsigi et al. ........................ 494/83 |
| 4,568,324 * | 2/1986 | Williams .............................. 494/82 |
| 4,846,773 * | 7/1989 | Giebeler et al. ....................... 494/82 |
| 4,890,947 * | 1/1990 | Williams et al. . |
| 4,897,075 * | 1/1990 | Sharples .............................. 494/84 |
| 4,913,696 * | 4/1990 | Romanauskas et al. ................. 434/84 |
| 4,946,433 * | 8/1990 | Gorodissky et al. ................... 494/83 |
| 4,972,110 * | 11/1990 | Gorodissky et al. ................... 494/84 |
| 5,026,341 * | 6/1991 | Giebeler .............................. 494/82 |
| 5,342,282 * | 8/1994 | Letourneur .......................... 464/180 |
| 5,415,616 * | 5/1995 | Wright ................................ 494/16 |
| 5,443,438 * | 8/1995 | Wright et al. ......................... 494/16 |
| 5,456,653 * | 10/1995 | Wright ................................ 494/82 |
| 5,681,257 * | 10/1997 | Letourneur ........................... 494/16 |
| 5,683,341 | 11/1997 | Giebeler . |
| 5,827,168 | 10/1998 | Howell . |
| 6,024,687 * | 2/2000 | Cheng ................................. 494/84 |

* cited by examiner

Primary Examiner—Charles E. Cooley
(74) Attorney, Agent, or Firm—William H. May; Margaret A. Kivinski

(57) ABSTRACT

A rotor drive shaft assembly for use in a centrifugation system. The rotor drive shaft has a bearing material configured as a sleeve and mounted on the inside wall of a spindle hub with a clearance existing between the sleeve and a housing that surrounds the lower base of the shaft. When the rotor and hub experience radial displacement at a critical speed, the sleeve makes contact with the housing in order to limit further radial displacement. Alternatively, the sleeve can be mounted on the outside of the housing with the clearance existing between the sleeve and the spindle hub, with the sleeve making contact with the spindle hub at the critical speed in order to limit further radial displacement. In another embodiment, a support tube is provided which surrounds the lower portion of the shaft with a clearance existing between the shaft and the support tube. When the shaft experiences radial displacement at the critical speed, the shaft makes contact with the support tube which limits further radial displacement.

11 Claims, 6 Drawing Sheets

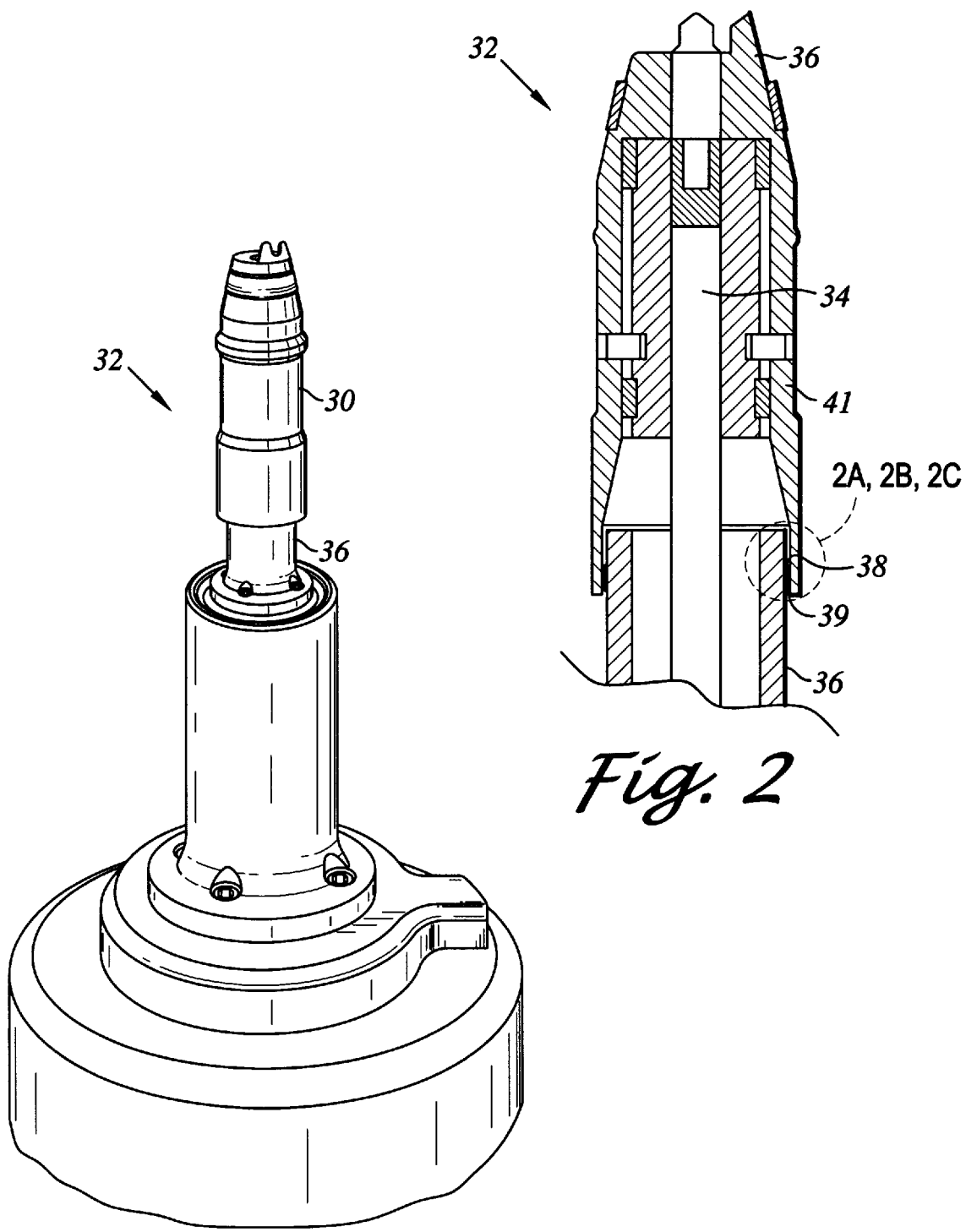

ROTOR SHAFT ASSEMBLY HAVING NON-LINEAR STIFFNESS

TECHNICAL FIELD OF THE INVENTION

The present invention relates to centrifuge systems and more specifically to a rotor shaft assembly used in a centrifuge system.

BACKGROUND OF THE INVENTION

Large centrifugation systems typically use a removable rotor for holding sample containers which contain the sample to be separated. The rotor is covered by a rotor lid and then placed into an instrument chamber wherein the rotor is spun during centrifugation.

A typical centrifuge assembly is shown with reference to FIG. 6. The centrifuge assembly 10 consists of a rotor assembly 12 which is connected by a rotor shaft assembly 14 to a drive motor 16. With reference to FIG. 7, the rotor assembly 12 includes a rotor body 110 which has a rotor chamber consisting of a plurality of chambers 112 for receiving configuration sample containers, not shown, which hold the sample being centrifuged and an interior upper chamber 114. The separation between the canister chambers 112 and the interior upper chamber 114 is shown by a dashed line 113. Interior chamber 114 is the volume which remains within the rotor chamber after the insertion of the centrifugation containers. At the upper end of the rotor body 110 is an annular opening defined by an edge 150. The opening in the top of the rotor body 110 is intended to be covered by a lid assembly 15. Rotor body 110 includes an axial bore 120 formed through the spin axis of the rotor body, extending from an open end within interior chamber 114 to an open end 125 at the bottom of the rotor body. Axial bore 120 includes one or more locking pins 130 which project into the interior volume of the axial bore.

Setting up the rotor assembly for a centrifugation run includes placing the rotor into a instrument chamber, not shown. The instrument chamber includes a spindle hub 20 which is part of the rotor shaft assembly 14 and is received in the axial bore 120 of the rotor body 110. The inserting end of the spindle hub 20 is slotted to engage locking pins 130, thus locking the spindle hub into position relative to the rotor body. The spindle hub 20 is coupled to the quill shaft 22 and the bottom of the shaft is coupled to a drive motor, or other type of rotation source, which provides the torque to spin the rotor. A housing 26 encloses a large portion of the shaft and forms the outer enclosure of the rotor shaft assembly 14.

A common problem that exists in centrifugation systems is that the centrifuge rotor becomes unbalanced and vibrates when the rotational speed in the system reaches a critical speed. Normally, the rotor rotates about its geometric center of gravity. As the speed of the rotor increases, it reaches a critical speed which is defined as "the angular speed at which a rotating shaft becomes dynamically unstable with large lateral amplitudes due to resonance with the natural frequencies of the lateral vibration of the shaft." (McGraw-Hill Dictionary of Scientific and Technical Terms, 5th Edition, 1994.) At the critical speed, the rotor experiences a radial displacement that is synchronous with rotation, the maximum displacement being at the critical speed. As the speed continues to increase beyond the critical speed, the radial displacement decreases until the only radial displacement remaining is that associated with rotor imbalance. Additionally, since the centrifuge operator must load the samples into the chambers, this can create a further imbalance to the rotating system, which can magnify the radial displacement and vibrating effect. During normal use, the rotor generally passes through its critical speed when accelerating from a stopped position to its normal operating speed and, after centrifugation is completed, when decelerating back to a stopped position.

When designing a shaft for a rotor assembly used in a centrifuge system, the design objectives are usually in conflict. One objective is to have a very flexible shaft in order to minimize bearing loads at super-critical speeds. A second objective is to have a stiff shaft in order to minimize rotor displacement at the critical speed. In conventional designs, the stiffness of the shaft is usually chosen as a compromise between these two competing objectives. Generally in the prior art, the stiffness of the shaft has been designed to have a linear characteristic in that the shaft would have the same stiffness at any rotor speed.

With reference to FIG. 8, rotor shaft assemblies in the prior art generally have a linear stiffness characteristic. As shown in FIG. 8, as the amount of radial displacement, shown on the x-axis, increases, the amount of force resisting the displacement or stiffness, shown on the y-axis, also increases proportionally, resulting in a graph 71 that is a straight line.

In U.S. Pat. No. 5,683,341 to Giebeler, there is a discussion of a prior art shaft design which has a high amount of stiffness for enabling the rotor to be maintained vertically aligned even though some imbalance forces are present. This design is then compared to the design of Giebeler which relies on the rotor being supported above its center of gravity to keep the rotor upright, rather than relying on the stiffness of the shaft. U.S. Pat. No. 5,827,168 to Howell attempts to minimize the vibrations of a centrifuge by using sliding and damping bearings to restrain vertical movement of a disk rotatably attached to the centrifuge's drive shaft.

It is the object of the present invention to provide a rotor shaft assembly having an improved characteristic of stiffness, such that the shaft can maintain the required stiffness to compensate for rotor displacement at the critical speed, but can be flexible at super-critical speeds in order to minimize bearing loads.

SUMMARY OF THE INVENTION

The above object has been achieved by a rotor shaft assembly having a non-linear stiffness characteristic. The shaft assembly provides stiffness when the rotor reaches the critical speed, but allows for the shaft to be flexible at super-critical speeds.

In a first embodiment of the invention, the rotor shaft assembly has a bearing sleeve mounted either on the inside of the spindle hub or on the outside of the housing in order to decrease the clearance between the housing and the spindle hub. This allows the shaft to be flexible within the clearance, but causes the housing to limit the radial displacement of the shaft when the rotor and spindle hub experience radial movement at the critical speed.

In a second embodiment of the invention, a support tube surrounds the lower portion of the shaft with a small clearance existing between the support tube and the shaft. When the radial displacement of the rotor shaft exceeds the clearance, the support tube provides higher resistance to any additional radial movement.

The rotor shaft assembly of the present invention allows the shaft to be flexible at super-critical speeds to minimize bearing loads, but also provides for a stiff shaft at the critical speed by limiting the amount of radial movement of the shaft. In this way, both of the desired design objectives discussed above may be achieved.

BRIEF DESCRIPTION OF THE DRAWINGS

FIG. 1 is a perspective view of a rotor shaft assembly according to a first embodiment of the present invention.

FIG. 2 is a cross-sectional view of the rotor shaft assembly shown in FIG. 1.

BEST MODE FOR CARRYING OUT THE INVENTION

Figure 2A:
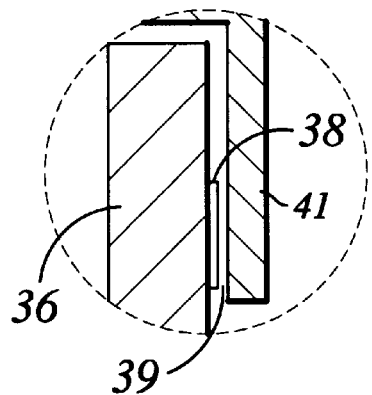
FIGS. 2A–2C are magnified views of a portion of the apparatus of FIG. 2, seen at the circle 2A.

With reference to FIGS. 1, 2 and 2A, a first embodiment of the rotor shaft assembly 32 of the present invention includes a spindle hub 30 enclosing the upper part of the shaft, or quill shaft 34, and a housing 36 enclosing the lower part of shaft (not shown). The spindle hub 30 and the shaft 34 are made out of steel or could be made of another type of metal. The housing 36 is preferably made out of a nylon or polymeric material, but may also be made out of a metal, such as steel. The housing 36 covers the top part of the motor and extends from the bottom of the shaft up toward the quill shaft 34. The housing 36 is mounted on the top of the motor and is not directly connected to the shaft itself. Rather, the housing 36 surrounds the shaft, with a clearance existing between the housing 36 and the shaft 34 such that the housing 36 does not rotate when the shaft 34 rotates. The spindle hub 30 is connected directly to the quill shaft 34, so the spindle hub 30 rotates synchronously with the quill shaft. The spindle hub 30 is generally of a cylindrical shape, and has a wall 41 that extends downward to cover the quill shaft 34 as well as a portion of the outside of the housing 36.

Figure 2B:
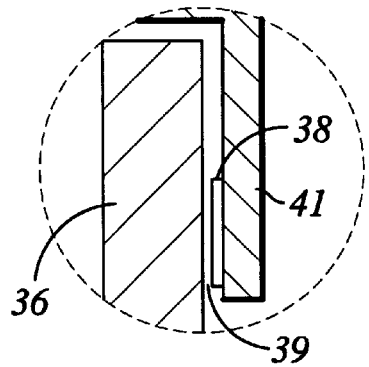
Figure 2C:
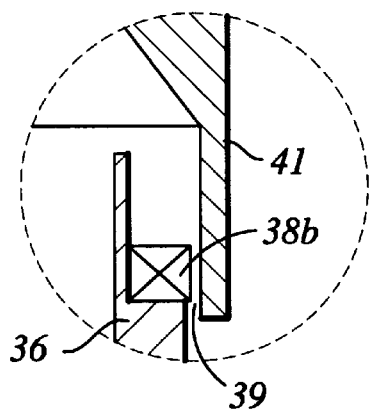

On the inner side of the wall 41 of the spindle hub 30, there is a bearing material configured as a bushing or sleeve 38. The sleeve 38 is connected to the outer side of the housing 36, as shown in FIG. 2A, such that the clearance 39 is between the sleeve 38 and the wall 41 of the spindle hub 30. Referring to FIG. 2B, alternatively the sleeve 38 may be connected to the inside of the spindle hub 30 such that there is a clearance 39 between the sleeve 38 and the housing 36. In either case, the clearance 39 allows the spindle hub 30 to rotate in conjunction with the rotation of the shaft 34 without contacting the housing 36, which is stationary in relation to the shaft 34. The size of the clearance 39 should be small in order to minimize the amount of radial displacement at the critical speed, but should be sufficiently large enough so that there is no chance that the spindle hub 30 can contact the housing 36 at super critical speeds, which would result in undesired bearing loads and excessive sleeve wear. A typical size of clearance 39 is about 0.030 inches. Referring to FIG. 2C, as an alternative to the sleeve 38, steel ball bearings 38B can be used to perform the same function as the sleeve. The ball bearings can be pressed on to the inside of wall 41 of the hub 30, or on to the outside wall of the housing 36. All of the metallic parts used in the shaft assembly are machined and then the parts are assembled.

In operation, as the centrifuge is activated and the speed of the rotor begins to increase, the quill shaft 34 remains aligned in its initial position as it rotates. As the speed of the rotor increases to the critical speed, the rotor, spindle hub, and shaft begin to experience a radial displacement as the axis of rotation of the shaft begins to move outward. When this occurs, the radial displacement is limited by the sleeve 38 contacting the housing 36, or by the sleeve 38 contacting the wall 41 of the spindle hub 30 in the case when the sleeve 38 is attached to the housing 36. As the speed of the rotor increases beyond the critical speed, the radial displacement of the spindle hub and shaft decreases such that the sleeve 38 no longer comes into contact with the housing 36. In this way, the shaft has a non-linear stiffness characteristic in that the shaft is flexible and can move within the clearance at speeds when there is little radial displacement, yet there is also stiffness as the mobility of the shaft is limited at speeds when the shaft is experiencing large radial displacement.

Figure 3:
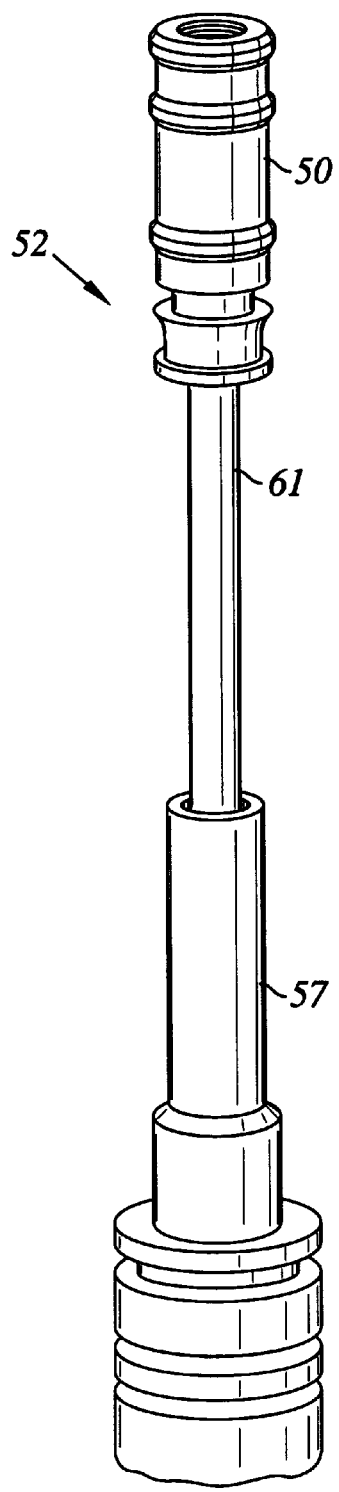
FIG. 3 is a perspective view of a rotor shaft assembly according to a second embodiment of the present invention.
Figure 4:
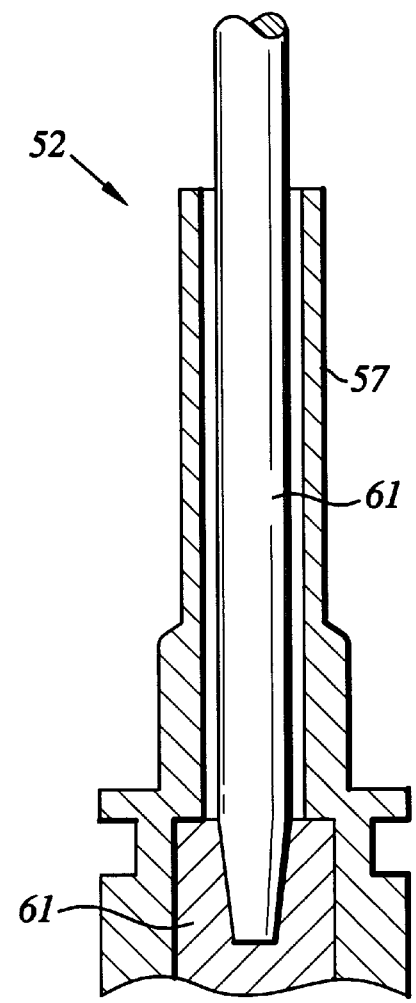
FIG. 4 is a cross-sectional view of the rotor shaft assembly shown in FIG. 3.

A second embodiment of the present invention is shown with reference to FIGS. 3 and 4. In the second embodiment of the rotor shaft assembly 52, a torsional damper 50 is attached to the quill 61 of the armature shaft 59 and a support tube 57 surrounds the bottom portion of the shaft 59. The majority of the quill is not enclosed by the support tube 57. The support tube 57 is made out of steel and is mounted on the top of the armature shaft 59. The support tube 57 surrounds the top of the armature shaft 59 and the lower portion of the quill 61 such that there is a clearance 55 between the support tube 57 and the quill 61. At low rotor speeds, the armature shaft 59, quill 61, torsional damper 50, and support tube 57 rotate with the rotor. As the speed of the rotor reaches the critical speed, the shaft experiences radial displacement and begins to move outward causing the quill 61 to contact the support tube 57. The support tube 57 provides a higher resistance to further radial displacement of the quill 61. As the speed of the rotor increases beyond the critical speed, the radial displacement decreases and the quill 61 return to its original position in relation to the support tube 57.

Figure 5:
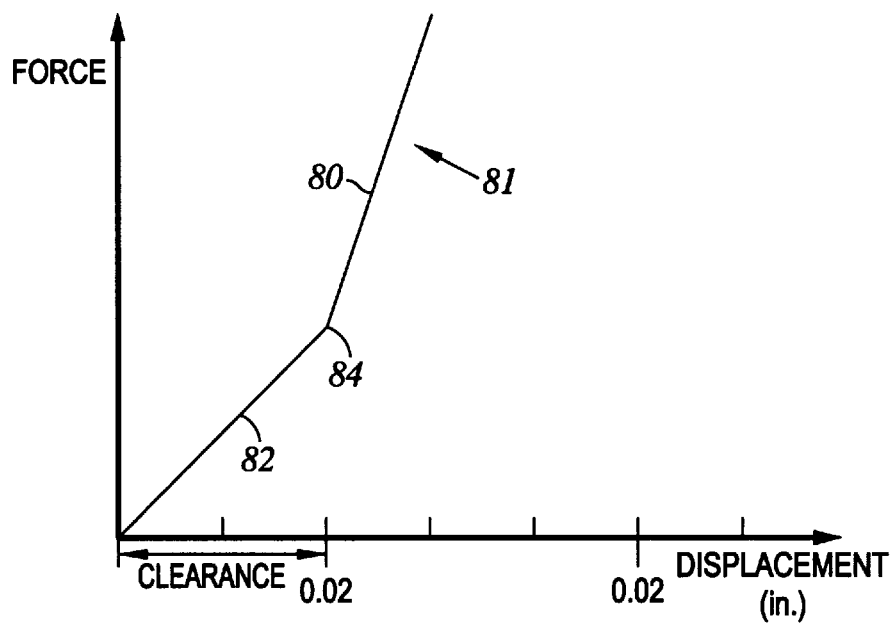
FIG. 5 is a graph of stiffness force vs. the amount of displacement of the rotor for the rotor shaft assembly of the present invention.
Figure 8:
FIG. 8 is a graph of stiffness force vs. the amount of displacement of the rotor for rotor shaft assemblies of the prior art.
Figure 6:
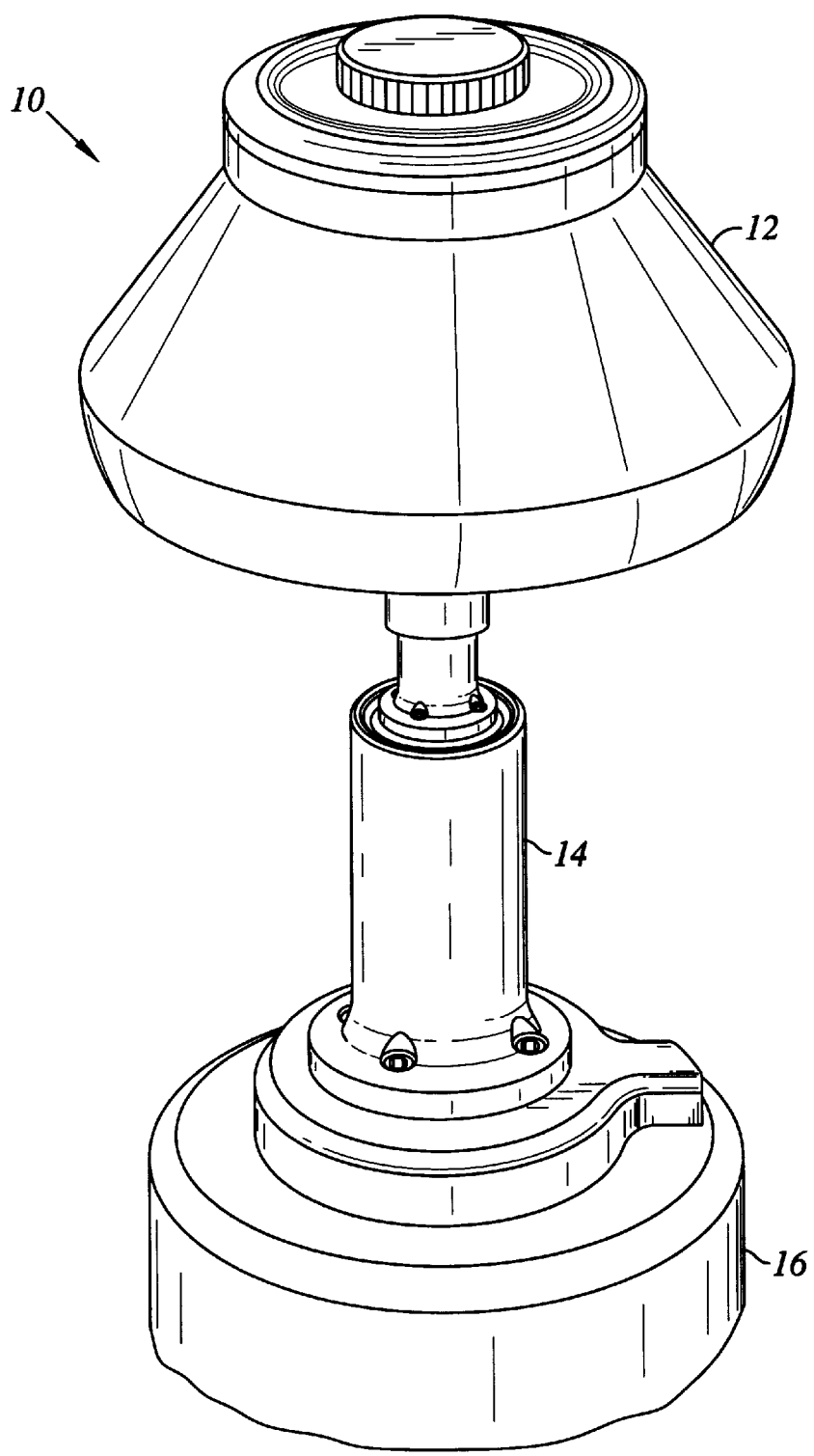
FIG. 6 is a perspective view of a centrifuge assembly as known in the prior art.
Figure 7:
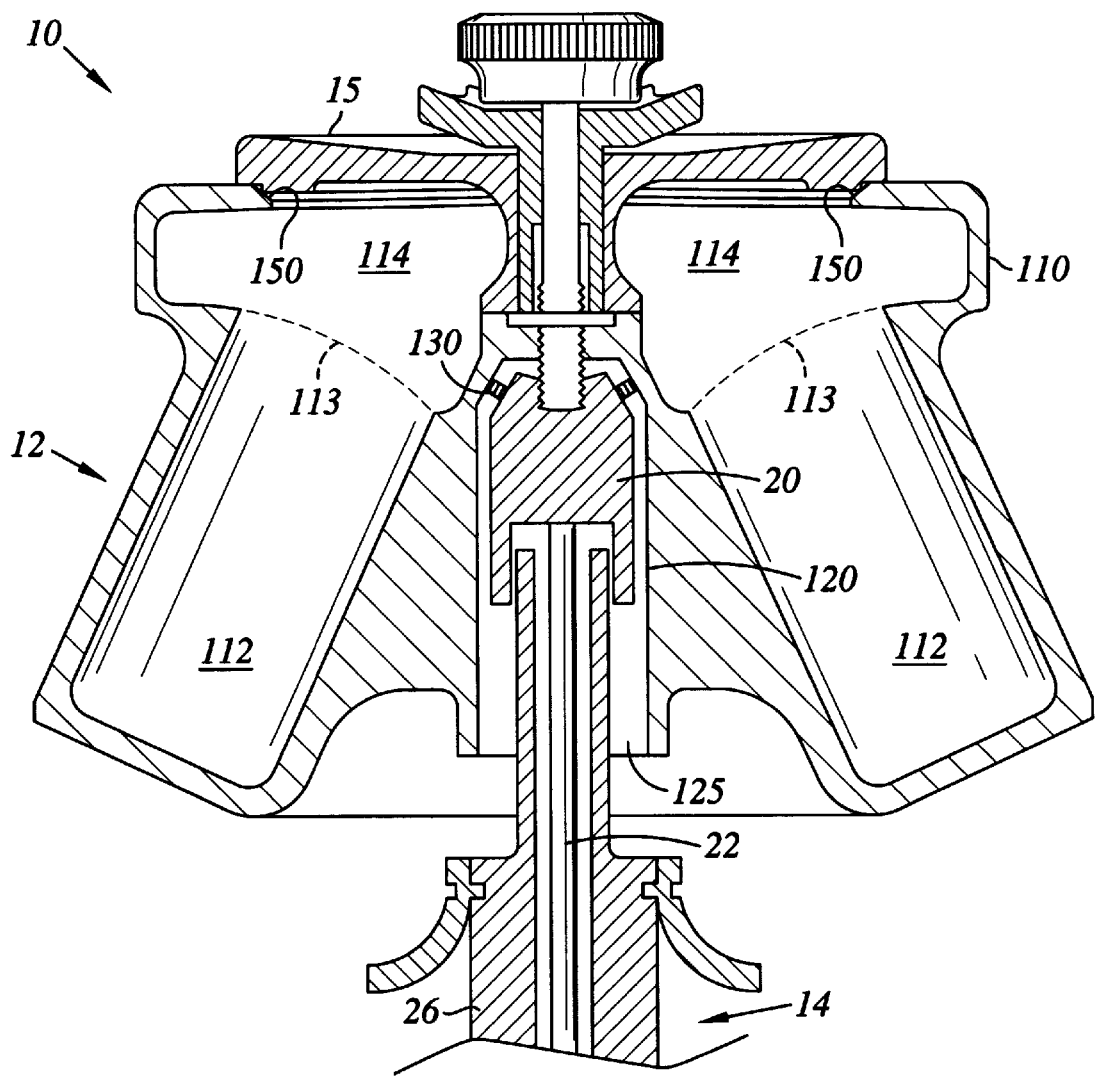
FIG. 7 is a cross-sectional view of the centrifuge assembly shown in FIG. 6.

Referring to FIG. 5, it can be seen that the graph 81 of stiffness vs. radial displacement for the present invention is not linear. The segment 82 of the graph 81 represents the case when there is no displacement or only minor displacement such that the displacement of the shaft does not exceed the size of the clearance between the spindle hub/sleeve and housing in the first embodiment, or the size of the clearance between the quill and the support tube in the second embodiment. The segment 80 of the graph 81 represents the case when the displacement exceeds the size of the clearance. Point 84 represents the point where the amount of displacement equals the size of the clearance, i.e. contact is made. As shown, the slope of the segment 80 is much steeper than the slope of segment 82, which indicates that the stiffness of the shaft has a higher resistance at times when there is a large amount of linear displacement. Thus, the overall stiffness of the shaft, as shown by graph 81, is not linear, as the stiffness varies to provide a greater amount of resistance when the displacement of the shaft exceeds the clearance.

The rotor shaft assembly designs of the present invention eliminate the need to compromise between the conflicting design objectives of providing a flexible support shaft to eliminate bearing loads at high rotor speeds and providing a stiff support shaft during times of radial displacement at the critical speed. The present invention allows both of these beneficial results to be achieved.

What is claimed is:

1. A rotor shaft assembly comprising:

an elongated shaft having a first end and a second end and having an axis of rotation;

a housing having means for attachment to a rotation source, the housing surrounding the second end of the shaft and extending along the shaft for a first length, a first clearance being established between the housing and the shaft;

a spindle hub having means for connection to a rotor and surrounding the first end of the shaft, the spindle hub having a wall portion surrounding the shaft and extending for a second length of the shaft and overlapping a first portion of the first length of the housing, a second clearance being established between the wall portion of the spindle hub and the first portion of the housing; and a sleeving circumferentially disposed between an inner side of the wall portion of the spindle hub and the first portion of the housing, wherein the sleeving is mounted either on the spindle hub or on the housing to form a third clearance between the sleeving and either the housing or the spindle hub, respectively, and the sleeving contacting either the housing or the spindle hub, respectively, to restrict motion when, upon reaching a critical speed, the axis of rotation of the shaft is shifted.

2. The rotor shaft assembly of claim 1 wherein the housing is made of a polymeric material.

3. The rotor shaft assembly of claim 1 wherein the sleeving is in the form of a bushing.

4. The rotor shaft assembly of claim 1 wherein the sleeving is in the form of a plurality of ball bearings.

5. The rotor shaft assembly of claim 1, wherein the third clearance has a size that minimizes a radial displacement of the shaft at the critical speed but does not allow the spindle hub to contact the housing at supercritical speeds.

6. The rotor shaft assembly of claim 5, wherein the third clearance is about 0.03 inch.

7. The rotor shaft assembly of claim 1, wherein the housing remains immobile during movement of the shaft.

8. In a centrifuge assembly of the type having (i) a rotor body with opposed upper and lower ends, the upper end having an opening into an interior chamber of the rotor body, the rotor body further having an axial bore extending between an open end in the interior chamber and the lower end of the rotor body, (ii) a lid assembly to cover the opening of the upper end of the rotor body, (iii) a rotation source to provide torque to spin the rotor body, and (iv) a rotor shaft assembly to couple the rotor body to the rotation source; the rotor shaft assembly comprising:

an elongated shaft having a first end and a second end, and having an axis of rotation;

a housing having means for attachment to the rotation source and surrounding the second end of the shaft and extending along the shaft for a first length, a first clearance being established between the housing and the shaft;

a spindle hub received in the axial bore of the rotor body and surrounding the first end of the shaft, the spindle hub having a wall portion surrounding the shaft and extending for a second length of the shaft and overlapping a first portion of the first length of the housing, a second clearance being established between the wall portion of the spindle hub and the first portion of the housing; and a sleeving circumferentially disposed between an inner side of the wall portion of the spindle hub and the first portion of the housing, wherein the sleeving is mounted either on the spindle hub or on the housing to form a third clearance between the sleeving and either the housing or the spindle hub, respectively, and the sleeving contacting either the housing or the spindle hub, respectively, to restrict motion when, upon reaching a critical speed, the axis of rotation of the shaft is shifted.

9. The rotor shaft assembly of claim 8 wherein the sleeving is in the form of a bushing.

10. The rotor shaft assembly of claim 8 wherein the sleeving is in the form of a plurality of ball bearings.

11. The rotor shaft assembly of claim 8 wherein the housing is made of a polymeric material.

* * * * *